US00RE50678E

(19) United States
(12) Reissued Patent
Agardh et al.

(10) Patent Number: US RE50,678 E
(45) Date of Reissued Patent: Nov. 25, 2025

(54) TRANSMITTING A PACKET VIA A WIRELESS LOCAL AREA NETWORK AFTER A DELAY

(71) Applicant: Sony Group Corporation, Tokyo (JP)

(72) Inventors: Kåre Agardh, Rydeback (SE); Vanja Plicanic Samuelsson, Lund (SE); Rickard Ljung, Helsingborg (SE); Peter C. Karlsson, Lund (SE)

(73) Assignee: SONY GROUP CORPORATION, Tokyo (JP)

(21) Appl. No.: 18/122,936

(22) Filed: Mar. 17, 2023

Related U.S. Patent Documents

Reissue of:
(64) Patent No.: 10,237,867
Issued: Mar. 19, 2019
Appl. No.: 15/257,146
Filed: Sep. 6, 2016

U.S. Applications:
(63) Continuation of application No. 14/276,352, filed on May 13, 2014, now Pat. No. 9,468,001.

(51) Int. Cl.
*H04L 65/60* (2022.01)
*H04L 65/75* (2022.01)
(Continued)

(52) U.S. Cl.
CPC ..... *H04W 72/0446* (2013.01); *H04L 65/60* (2013.01); *H04L 65/762* (2022.05);
(Continued)

(58) Field of Classification Search
CPC ..... H04W 72/0446; H04W 72/23; H04W 74/0808; H04W 84/12; H04W 88/08;
(Continued)

(56) References Cited

U.S. PATENT DOCUMENTS 5,995,448 A 11/1999 Kalkunte
5,995,488 A * 11/1999 Kalkunte ..... H04L 12/4013 370/232
(Continued)

FOREIGN PATENT DOCUMENTS

JP 2008079141 A 4/2008

OTHER PUBLICATIONS

International Preliminary Report on Patentability Corresponding to International Application No. PCT/JP2014/005710; Date of Mailing: Nov. 24, 2016; 8 Pages.
(Continued)

*Primary Examiner* — Mark Sager
(74) *Attorney, Agent, or Firm* — Myers Bigel, P.A.

(57) ABSTRACT

Methods of operating an electronic device are provided. A method of operating a first electronic device includes listening for a wireless transmission by a second electronic device on a wireless communications channel. The method includes determining whether a packet is a particular type of packet. The method includes assigning a randomized time delay value that defines a randomized delay period, in response to determining that the packet is the particular type of packet. The method includes beginning the randomized delay period in response to determining that the wireless communications channel is clear. Moreover, the method includes transmitting the packet via the wireless communications channel based on expiration of the randomized delay period. Related electronic devices and computer program products are also provided.

19 Claims, 7 Drawing Sheets

(51) Int. Cl.

| | |
|---|---|
| ***H04L 65/80*** | (2022.01) |
| ***H04W 72/0446*** | (2023.01) |
| ***H04W 72/23*** | (2023.01) |
| ***H04W 74/0808*** | (2024.01) |
| *H04W 84/12* | (2009.01) |
| *H04W 88/08* | (2009.01) |

(52) U.S. Cl.
CPC ..... *H04L 65/765* (2022.05); *H04L 65/80* (2013.01); *H04W 72/23* (2023.01); *H04W 74/0808* (2013.01); *H04W 84/12* (2013.01); *H04W 88/08* (2013.01)

(58) Field of Classification Search
CPC ..... H04L 65/60; H04L 65/762; H04L 65/765; H04L 65/80
See application file for complete search history.

(56) References Cited

U.S. PATENT DOCUMENTS

| | | | | |
|---|---|---|---|---|
| 6,026,095 | A * | 2/2000 | Sherer | H04L 12/413 370/401 |
| 6,157,616 | A * | 12/2000 | Whitehead | H04L 47/10 370/252 |
| 6,360,271 | B1 * | 3/2002 | Schuster | H04J 3/0632 370/516 |
| 2003/0081628 | A1 * | 5/2003 | Sugar | H04L 47/10 370/461 |
| 2005/0141545 | A1 * | 6/2005 | Fein | H04B 7/0617 370/445 |
| 2006/0187895 | A1 | 8/2006 | Nandagopalan | |
| 2007/0165557 | A1 | 7/2007 | Donovan | |
| 2007/0253332 | A1 * | 11/2007 | Fawaz | H04L 47/10 370/230 |
| 2011/0069686 | A1 * | 3/2011 | Raman | H04L 12/413 370/338 |
| 2014/0119280 | A1 * | 5/2014 | Azizi | H04W 74/0816 370/328 |
| 2014/0140354 | A1 * | 5/2014 | Mormina | H04J 3/16 370/442 |

OTHER PUBLICATIONS

LG Electronics, Discussion on D2D synchronization procedure, 3GPP TSG RAN WG1 Meeting #76bis, Shenzhen, China, Mar. 31-Apr. 4, 2014, 5 pages.

Notification of Transmittal of the International Search Report and the Written Opinion of the International Searching Authority, or the Declaration, in corresponding PCT Application No. PCT/JP2014/005710 mailed Feb. 16, 2015 (11 pages).

Potevio, Resource allocation Mode 2 for D2D communication, 3GPP TSG RAN WG1 Meeting #77, 3 pages.

Notification of Transmittal of the International Search Report and the Written Opinion of the International Searching Authority, or the Declaration, in corresponding PCT Application No. PCT/JP2014/005710 dated Feb. 16, 2015 (11 pages).

Aad et al., "Differentiation mechanisms for IEEE 802.11", Proceedings IEEE Infocom 2001 Conference on Computer Communications, Twentieth Annual Joint Conference of the IEEE Computer and Communications Society, Cat. No. 01CH37213, Piscat, vol. 1, Apr. 22, 2001, pp. 209-218.

International Preliminary Report on Patentability Corresponding to International Application No. PCT/JP2014/005710; dated Nov. 24, 2016; 8 Pages.

* cited by examiner

TRANSMITTING A PACKET VIA A WIRELESS LOCAL AREA NETWORK AFTER A DELAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[The present application is a] *This is an application for reissue of U.S. Pat. No. 10,237,867 which was filed as U.S. patent appliation Ser. No. 15/257,146 filed on Sep. 6, 2016 and was a* continuation application of and claims priority from U.S. patent application Ser. No. 14/276,352, filed on May 13, 2014, the disclosure*s* and content*s* of which are hereby incorporated by reference herein as if set forth in [ its] *their* entirety.

TECHNICAL FIELD

The present disclosure is directed to electronic devices and, more particularly, to providing Wireless Local Area Network (WLAN) communications via electronic devices.

BACKGROUND

Many wired and wireless networks transport large quantities of relatively small packets. For example, although small packets may, in aggregate, only represent a small percentage (e.g., a single-digit percentage) of the overall size of a network, approximately thirty percent of the number of packets transported in the network may be small packets. Moreover, networks may be inefficient with the transportation of small packets. For example, networks may use large overheads that waste significant portions of available air capacity. Although some networks may attempt to increase efficiency for small packets by aggregating a group of small packets together, thus transporting the aggregated small packets through the networks as if the aggregated small packets were one large packet, such aggregation may provide undesirable delays for some types of packets.

SUMMARY

Various embodiments may provide a method of operating a first electronic device that is connected to a Wireless Local Area Network (WLAN). In one embodiment, the method includes listening for a wireless transmission by a second electronic device on a wireless communications channel. The method further includes beginning a randomized delay period in response to determining that the wireless communications channel is clear. Moreover, the method includes transmitting a packet to an access point of the WLAN via the wireless communications channel after the randomized delay period.

In various embodiments, the method may include determining whether the packet is a small packet, and assigning a randomized time delay value that defines the randomized delay period, in response to determining that the packet is a small packet. In some embodiments, the small packet may be an unaggregated streaming video uplink data packet or an unaggregated acknowledgement packet responsive to downlink video traffic, and transmitting the packet may include transmitting the unaggregated streaming video uplink data packet or the unaggregated acknowledgement packet responsive to downlink video traffic to the access point of the WLAN via the wireless communications channel after the randomized delay period.

According to various embodiments, the packet may be a first uplink packet of the first electronic device, the randomized delay period may be a first randomized delay period, the wireless transmission by the second electronic device may be a first wireless transmission by the second electronic device on the wireless communications channel, and the method may include listening for a second wireless transmission by the second electronic device or by a third electronic device on the wireless communications channel. Moreover, the method may include beginning a second randomized delay period in response to listening for the second wireless transmission and determining that the wireless communications channel is clear, and transmitting a second uplink packet to the access point of the WLAN via the wireless communications channel after the second randomized delay period.

In various embodiments, the first and second randomized delay periods may be different first and second quantities of time, respectively, and transmitting the second uplink packet may include transmitting the second uplink packet to the access point of the WLAN via the wireless communications channel after the second randomized delay period that is the second quantity of time that is different from the first quantity of time of the first randomized delay period.

According to various embodiments, the packet may be a first uplink packet of the first electronic device, the wireless transmission by the second electronic device may be a first wireless transmission by the second electronic device on the wireless communications channel, and the method may include listening for a second wireless transmission by the second electronic device or by a third electronic device on the wireless communications channel. Moreover, the method may include beginning a static delay period in response to listening for the second wireless transmission and determining that the wireless communications channel is clear, and transmitting a second uplink packet to the access point of the WLAN via the wireless communications channel after the static delay period.

In various embodiments, the first uplink packet may have a first size that is smaller than a second size of the second uplink packet, the randomized delay period may be a first quantity of time that is different from (e.g., shorter or longer than) a second quantity of the time of the static delay period, and transmitting the second uplink packet may include transmitting the second uplink packet to the access point of the WLAN via the wireless communications channel after the static delay period that is the second quantity of time that is different from the first quantity of time of the randomized delay period. Moreover, in some embodiments, the method may include assigning the randomized delay period in response to determining that the first uplink packet is a small packet, and selecting the static delay period in response to determining that the second uplink packet is not a small packet.

According to various embodiments, the method may include receiving signaling from the access point of the WLAN regarding uplink packet randomized time delays. Moreover, receiving the signaling may include receiving a command from the access point of the WLAN to enable or disable the uplink packet randomized time delays. Additionally or alternatively, receiving the signaling may include receiving signaling from the access point of the WLAN providing one or more parameters regarding time delay values defining the uplink packet randomized time delays. Additionally or alternatively, the first electronic device may be one of a plurality of electronic devices connected to the WLAN, and receiving the signaling may include receiving signaling, from the access point of the WLAN, that is based on traffic from the plurality of electronic devices connected to the WLAN. Moreover, the method may include selecting a time delay value among a plurality of time delay values that define respective ones of the uplink packet randomized time delays, in response to receiving the signaling from the access point of the WLAN that is based on the traffic from the plurality of electronic devices connected to the WLAN.

In various embodiments, the randomized delay period may be a randomized Inter-Frame Spacing (IFS) delay period, and transmitting the packet may include transmitting the packet to the access point of the WLAN via the wireless communications channel after the randomized IFS delay period. Moreover, in some embodiments, the method may include determining whether the packet is a delay-sensitive packet, and then assigning a randomized time delay value that defines the randomized delay period, in response to determining that the packet is a delay-sensitive packet. Additionally or alternatively, in some embodiments, the method may include selecting a particular distribution (e.g., uniform, non-uniform, a particular range of values, etc.) among a plurality of different distributions of randomized values, and the randomized delay period may be defined by one of the randomized values of the particular distribution of randomized values.

A first electronic device, according to various embodiments, may be provided. In one embodiment, the first electronic device includes a network interface configured to provide a communications interface with a Wireless Local Area Network (WLAN). Moreover, the first electronic device further includes a processor configured to control listening, via the network interface, for a wireless transmission by a second electronic device on a wireless communications channel. The processor is configured to begin a randomized delay period in response to determining that the wireless communications channel is clear. Moreover, the processor is configured to control transmission, via the network interface, of a packet to an access point of the WLAN via the wireless communications channel after the randomized delay period.

In various embodiments, the processor may be configured to determine whether the packet is a small packet, and to assign a randomized time delay value that defines the randomized delay period, in response to determining that the packet is a small packet. In some embodiments, the small packet may be an unaggregated streaming video uplink data packet or an unaggregated acknowledgement packet responsive to downlink video traffic, and the processor may be configured to transmit the packet by transmitting, via the network interface, the unaggregated streaming video uplink data packet (or the unaggregated acknowledgement packet responsive to downlink video traffic) to the access point of the WLAN via the wireless communications channel after the randomized delay period.

A computer program product, according to various embodiments, may be provided. In one embodiment, the computer program product includes a tangible computer readable storage medium including computer readable program code therein that when executed by a processor of a first electronic device causes the processor to perform operations including controlling listening, via a network interface configured to provide a communications interface with a Wireless Local Area Network (WLAN), for a wireless transmission by a second electronic device on a wireless communications channel. The operations further include beginning a randomized delay period in response to determining that the wireless communications channel is clear. Moreover, the operations include controlling transmission, via the network interface, of a packet to an access point of the WLAN via the wireless communications channel after the randomized delay period.

In various embodiments, the computer readable program code, when executed by the processor, may cause the processor to perform operations include determining whether the packet is a small packet, and assigning a randomized time delay value that defines the randomized delay period, in response to determining that the packet is a small packet. In some embodiments, the small packet may be an unaggregated streaming video uplink data packet or an unaggregated acknowledgement packet responsive to downlink video traffic, and the computer readable program code, when executed by the processor, may cause the processor to perform operations including transmitting, via the network interface, the unaggregated streaming video uplink data packet (or the unaggregated acknowledgement packet responsive to downlink video traffic) to the access point of the WLAN via the wireless communications channel after the randomized delay period.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings.

DETAILED DESCRIPTION

Figure 1:
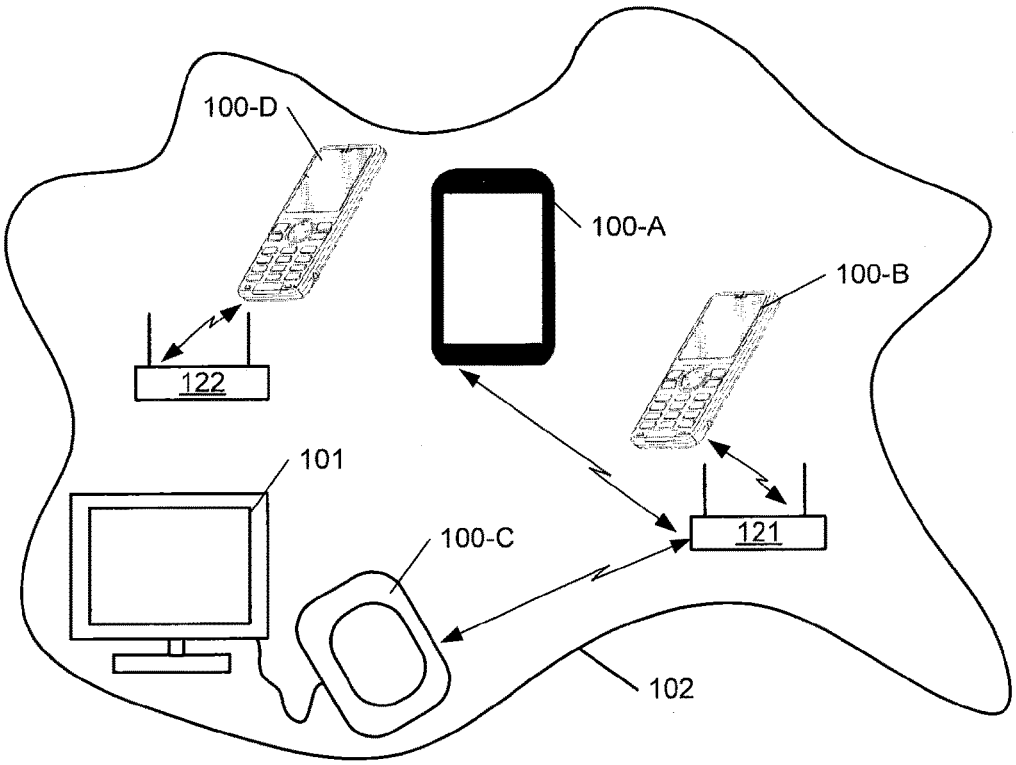
FIG. 1 is a schematic diagram of a geographical area that includes a plurality of electronic devices and at least one WLAN access point, according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although some networks may attempt to increase efficiency for small packets by aggregating a group of small packets together, such aggregation may provide undesirable delays for some types of packets. For example, aggregation of packets may provide undesirable delays for delay-sensitive packets such as packets for real-time (or otherwise streaming) video. As an example, the electronic devices described herein may receive video downlink traffic and may responsively send small, delay-sensitive acknowledgement packets via an uplink. Various embodiments of present inventive concepts, however, increase the efficiency of transmitting small packets in WLANs. In particular, by randomizing the lengths of delay periods before transmitting small packets in WLANs, various embodiments may reduce collisions between different electronic devices that are transmitting packets.

Specifically, when many electronic devices in a WLAN want to send small amounts of data (or other signaling/information) via a channel of the WLAN, they will all wait for the channel to be free of traffic and then try to transmit. Accordingly, the risk of collisions between transmissions (e.g., simultaneous transmissions by different electronic devices) may be high when the number of electronic devices waiting to transmit via the same channel is high. By randomizing delay periods/lengths, however, various embodiments of present inventive concepts may reduce the likelihood of collisions because different electronic devices will be less likely to use the same delay period at the same time. In other words, the times when respective electronic devices transmit will be more likely to be distributed.

Whereas cellular networks may use a scheduler that tells electronic devices when to communicate, WLANs may use a form of distributed access control rather than a scheduler. WLANs, therefore, may particularly benefit from randomized (rather than static) delay periods that reduce the likelihood of collisions between transmissions by different electronic devices. Moreover, when WLAN transmissions collide, the corresponding electronic devices may be forced into a penalty/backoff scheme that forces the electronic devices to remain silent for an extended period of time before retrying the transmissions. The penalty/backoff scheme not only increases the delay of electronic devices in delivering their data (or other signaling/information), but, further, increases power consumption. Accordingly, various embodiments herein provide a randomized delay period that may reduce the likelihood that an electronic device will have to enter a penalty/backoff scheme, and may thus decrease transmission delay and reduce power consumption.

Referring to FIG. 1, a schematic diagram is provided of a geographical area 102 that includes a plurality of electronic devices 100 and at least one WLAN access point (e.g., at least one of the WLAN access points 121, 122), according to some embodiments. A WLAN access point described herein may also be referred to as a Wi-Fi/WLAN hot spot or a Wi-Fi/WLAN router. Moreover, although the two WLAN access points 121, 122 are illustrated in FIG. 1, the geographical area 102 may include one, two, three, or more WLAN access points. The WLAN access points 121, 122 may be personal, business, public, and/or private WLAN access points.

Additionally, although four electronic devices 100-A, 100-B, 100-C, and 100-D are illustrated in FIG. 1, the geographical area 102 may include one, two, three, four, five, or more electronic devices 100. For example, if the geographical area 102 includes a sports arena/stadium, then the geographical area 102 may include thousands or tens of thousands of electronic devices 100. As another example, if the geographical area 102 includes a business or a public building, then the geographical area 102 may include tens or hundreds of electronic devices 100. Accordingly, the WLAN access points 121, 122 (and/or more or fewer WLAN access points) may provide WLAN communications with one, two, three, four, five, or more electronic devices 100.

An electronic device 100 (also referred to as a User Equipment (UE) or wireless terminal) may include, but is not limited to, a mobile/cellular telephone, a tablet computer, a laptop/portable computer, a pocket computer, a hand-held computer, a desktop computer, and/or a streaming-media (e.g., streaming-video) device/box. Specifically, the term electronic device 100, as used herein, may include any device that can transmit packets to one of the WLAN access points 121, 122. Moreover, according to some embodiments, cellular connectivity of the electronic device 100 is not required. For example, the electronic devices 100-B and 100-D illustrate mobile/cellular telephones, whereas the electronic device 100-A illustrates a tablet computer that may or may not have cellular communications capabilities.

Moreover, the electronic device 100-C illustrates a streaming-video box that connects a television 101 to streaming-video services. In some embodiments, the functionality of the streaming-video box may be integrated into the television 101. Additionally or alternatively, the streaming-video box may transmit video packets to one or more of the electronic devices 100 via one or more of the WLAN access points 121, 122. In some embodiments, the streaming-video box may receive video packets from one or more of the electronic devices 100 via one or more of the WLAN access points 121, 122.

Figure 2:
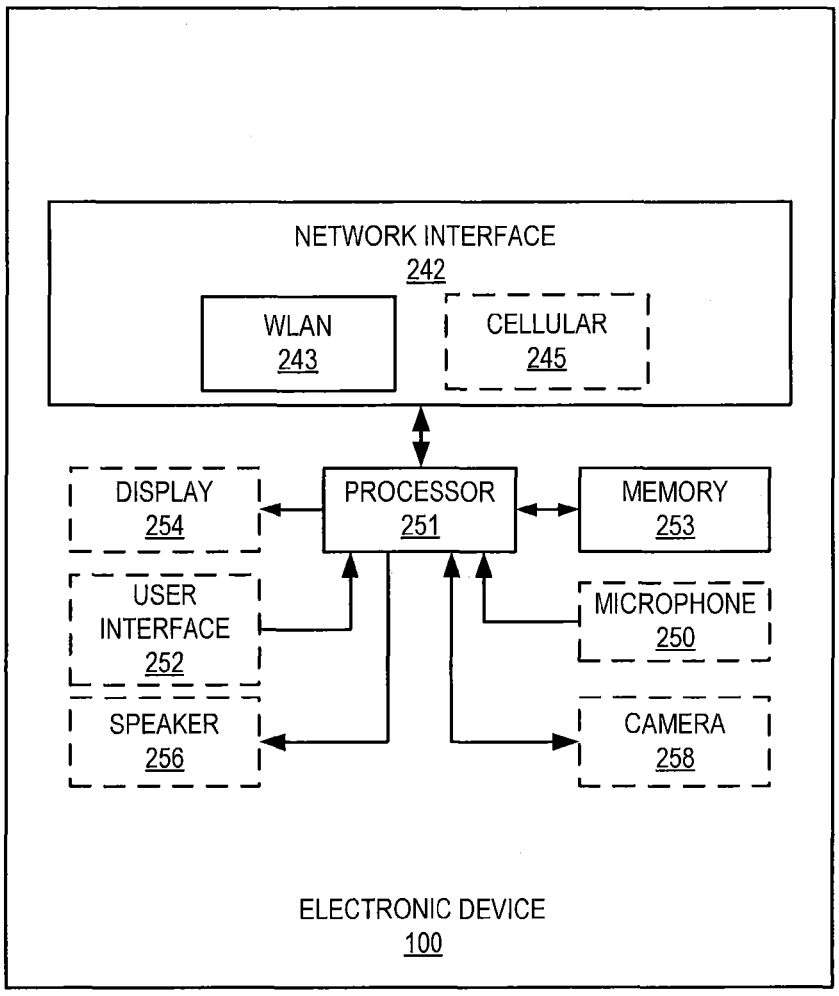
FIG. 2 is a block diagram of an electronic device, according to some embodiments.

FIG. 2 is a block diagram of an electronic device 100 according to some embodiments. As illustrated in FIG. 2, an electronic device 100 may include a network interface 242, a processor (e.g., processor circuit) 251, and a memory 253. The network interface 242 may include a WLAN interface 243 that is configured to provide WLAN communications with one of the WLAN access points 121, 122. The network interface 242 may optionally include a cellular interface 245 that is configured to provide cellular wireless connectivity. The network interface 242 may be connected to one or more antenna elements or antenna systems. Moreover, the electronic device 100 may optionally include a display 254, a user interface 252, a camera 258, a speaker 256, and/or a microphone 250.

Figure 3A:
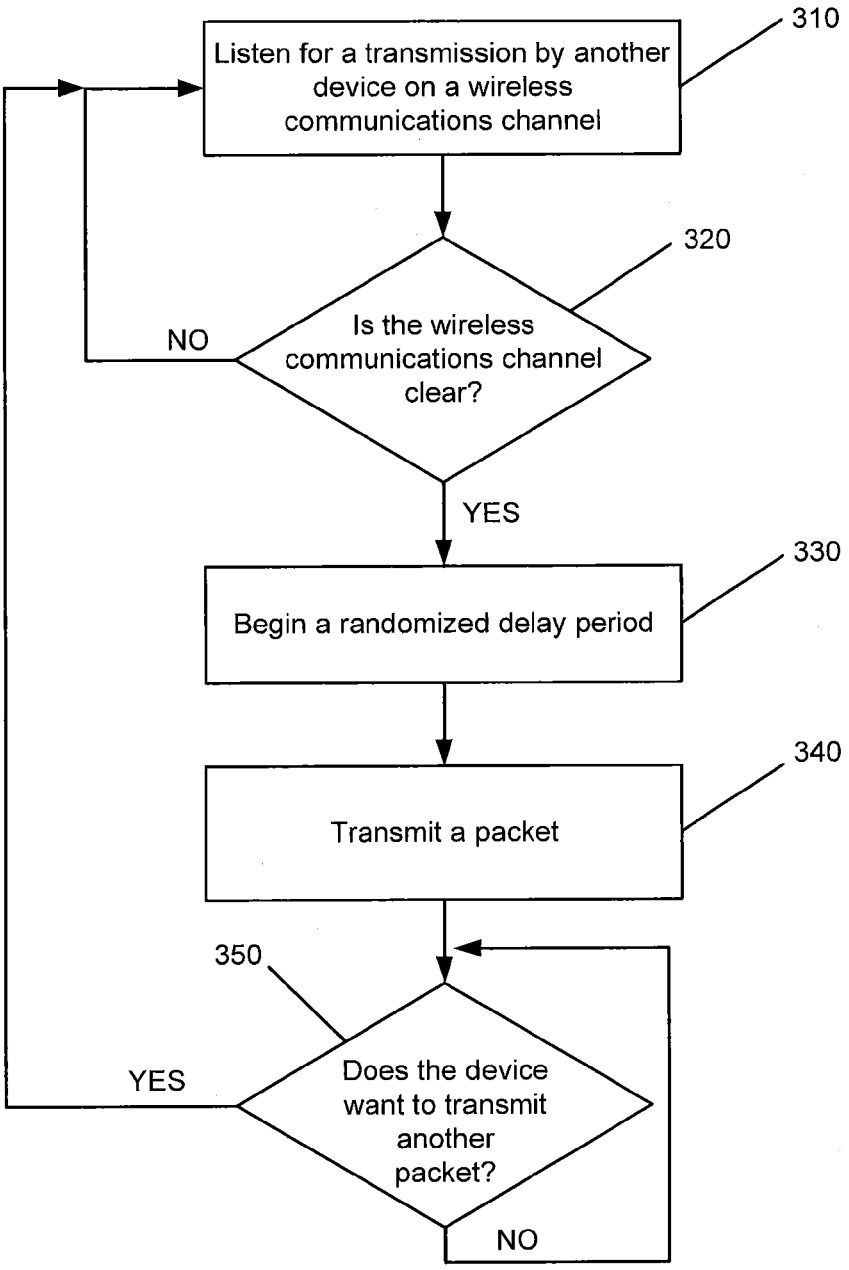
FIGS. 3A-3C are flow charts illustrating operations of an electronic device, according to some embodiments.
Figure 3B:
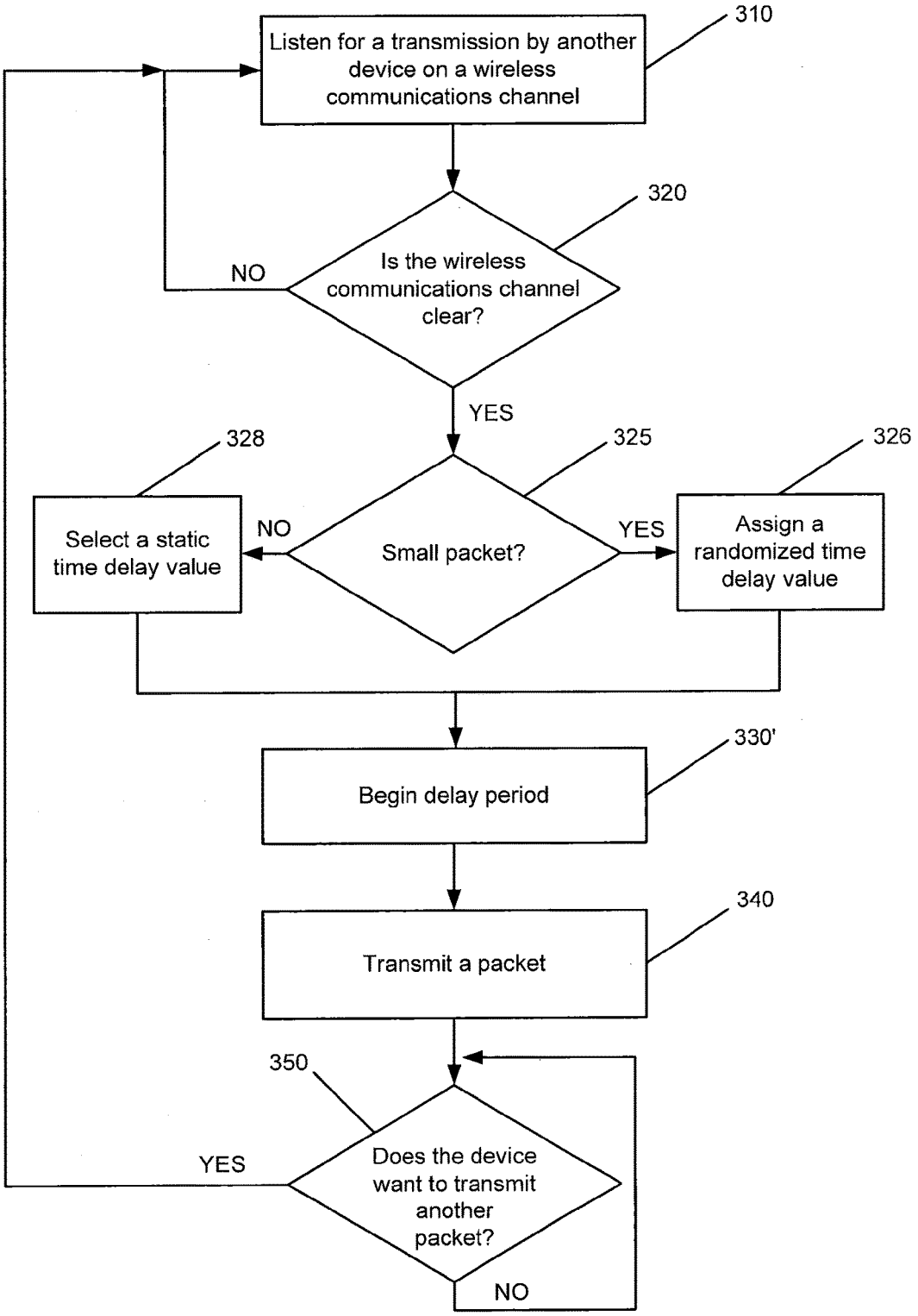
Figure 3C:
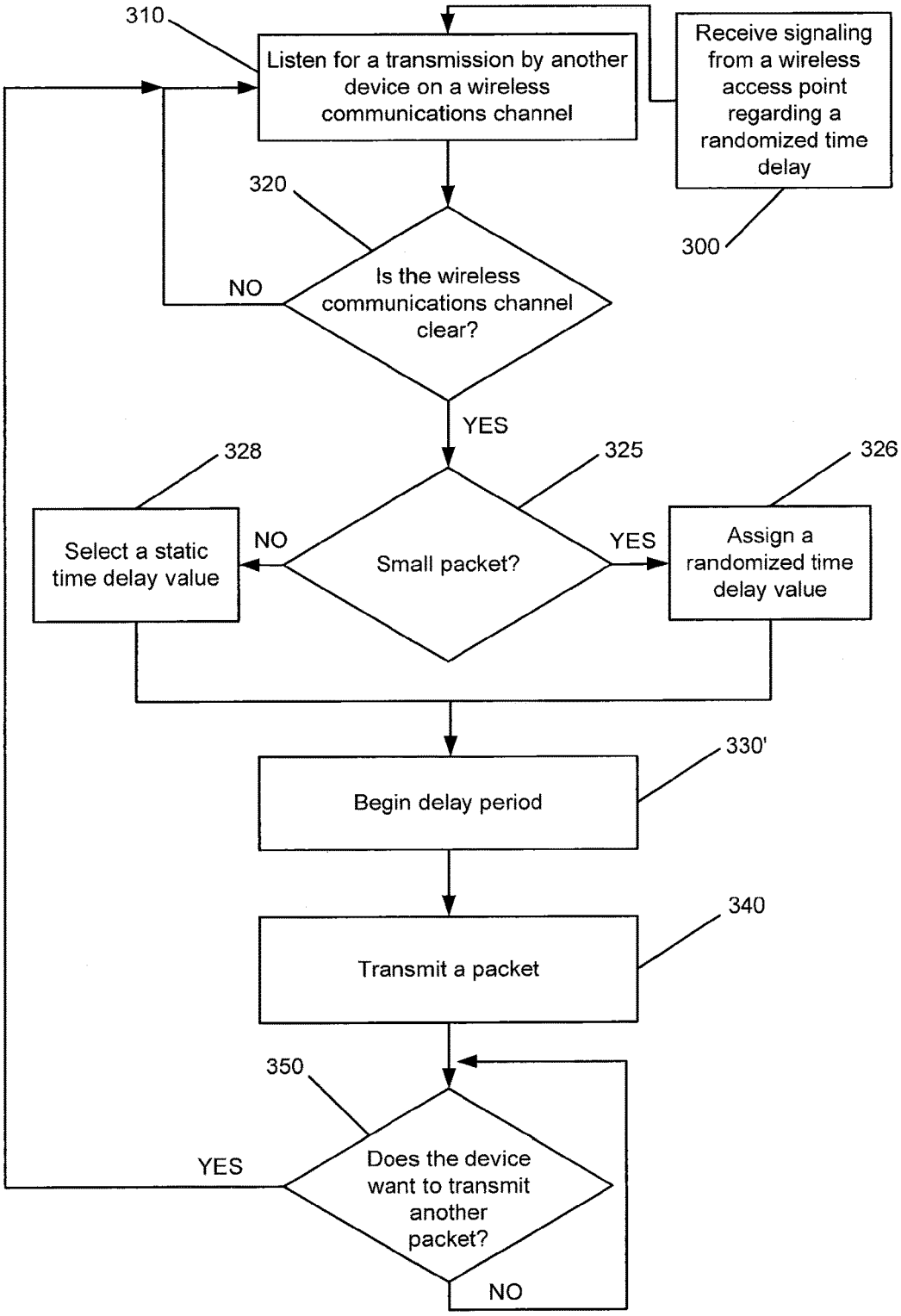

Referring still to FIG. 2, the memory 253 can store computer program instructions that, when executed by the processor circuit 251, carry out operations of the electronic device 100 (e.g., as illustrated in the flow charts of FIGS. 3A-3C). As an example, the memory 253 can be non-volatile memory, such as a flash memory, that retains the stored data while power is removed from the memory 253.

FIGS. 3A-3C are flow charts illustrating operations of an electronic device 100 according to some embodiments. Referring to FIG. 3A, the electronic device 100 may be connected to a WLAN, and the operations may include listening (Block 310) for traffic (e.g., a wireless transmission) by another electronic device 100 on a wireless communications channel. For example, the electronic device 100-A illustrated in FIG. 1 may be communicatively-connected to the WLAN access point 121, and may be sensing/detecting/scanning wireless transmissions on a specific wireless communications channel (e.g., a specific one of the IEEE 802.11 channels 1-14 or another specific WLAN channel). As an example, the electronic device 100-A may determine that the electronic device 100-B connected to the same WLAN access point 121 is transmitting on the specific channel. As another example, the electronic device 100-A may determine that the electronic device 100-D connected to the different WLAN access point 122 is transmitting on the specific channel. Accordingly, the traffic detected by the electronic device 100 may not necessarily be from another electronic device 100 in the same WLAN system/network.

Referring still to FIG. 3A, operations of the electronic device 100 may include determining (Block 320) whether the wireless communications channel is clear (e.g., silent or otherwise free of transmissions by another electronic device 100). If the wireless communications channel is not clear, then the electronic device 100 may continue listening (Block 310) for a transmission by another electronic device 100 on the channel.

On the other hand, if the wireless communications channel is clear, then the electronic device 100 may begin (Block 330) a randomized delay period. For example, the electronic device 100 may start counting a quantity of time that is required to fulfill the randomized delay period, after the traffic that is detected by the electronic device 100 has cleared. In other words, once activity on the channel ceases, the electronic device 100 may start counting/delaying before beginning its own transmission. The randomized delay period is referred to herein as randomized because the electronic device 100 according to various embodiments of present inventive concepts uses different delay periods (e.g., different quantities of time) for different packets rather than using the same static delay period for every packet. In other words, the term "randomized," as used herein, may refer to varying the length of delay periods such that a plurality of packets transmitted by the electronic device 100 are transmitted after different respective delay periods. For example, three consecutive packets may be transmitted by the electronic device 100 after three delay periods having respective lengths of time. Also, the delay periods may be randomized such that different electronic devices 100 use different sequences of delay period lengths. In other words, the likelihood that two different electronic devices 100 performing randomization operations described herein could independently and simultaneously (or nearly simultaneously) transmit three consecutive packets using the same sequence of three delay periods would be very low. Moreover, in some embodiments, the term "randomized," as used herein, may refer to pseudo-random number generation.

The electronic device 100 may continue listening for traffic by another electronic device 100 on the wireless communications channel during the randomized delay period and may return to the operations of Block 320 if traffic is detected. In other words, operations in Block 330 of beginning (as well as fulfilling) the randomized delay period may further include Block 310's operations of listening for traffic by another electronic device 100 on the wireless communications channel. Accordingly, the randomized delay period may be aborted if traffic is detected at any point during the randomized delay period.

Moreover, operations of the electronic device 100 may include transmitting (Block 340) a packet to an access point (e.g., the access point 121) of the WLAN, via the wireless communications channel, after the randomized delay period. In other words, once the randomized delay period is complete (e.g., has expired), the electronic device 100 may proceed with transmitting a packet that it has been waiting to transmit, to a WLAN access point. If the electronic device 100 subsequently wants (Block 350) to transmit another packet to the WLAN access point, then the electronic device 100 may perform the operations of Blocks 310-330 with respect to the other packet before transmitting the other packet.

Because waiting for packets to aggregate before transmitting them may be undesirable for delay-sensitive applications such as streaming video, operations of transmitting (Block 340) a packet may include transmitting an unaggregated (e.g., individual, ungrouped) uplink acknowledgement packet that is responsive to downlink video traffic (or, alternatively, may include transmitting an unaggregated streaming video uplink data packet) to a WLAN access point via the wireless communications channel, after the randomized delay period. As an example, the electronic device 100 may receive video downlink traffic via a WLAN access point and may responsively send a small, delay-sensitive acknowledgement packet via an uplink to the WLAN access point. Accordingly, various embodiments herein may provide a randomized delay period for an uplink acknowledgement packet that is to be transmitted by the electronic device 100 responsive to received downlink video traffic (or may alternatively provide a randomized delay period for a streaming video uplink data packet that is to be transmitted by the electronic device 100). Alternatively, various embodiments may provide a randomized delay period for any other operation that is delay sensitive, such as a voice/video communication or a Hypertext Transfer Protocol (HTTP) request for a web page that is particularly delay sensitive.

Referring now to FIG. 3B, operations of the electronic device 100 may include determining (Block 325) whether the packet that the electronic device 100 wants to transmit is a small packet. For example, a small packet described herein may refer to a packet having a size of no more than a few hundred bytes. As an example, a small packet may be a packet having a size between about 100 bytes and about 250 bytes. As illustrated in FIG. 3B, the electronic device 100 may decide to use randomized delay values only for small packets. Additionally or alternatively, operations of Block 325 may include determining whether the packet that the electronic device 100 wants to transmit is a delay-sensitive packet. For example, a packet for a streaming-video application/service may be a delay-sensitive packet and/or a small packet. Moreover, a packet described herein that the electronic device 100 wants to transmit may be referred to as an uplink packet because such a packet will be transmitted from the electronic device 100 to a WLAN access point. In particular, the words "uplink packet," as used herein, may refer to any type of uplink packet, including an acknowledgement packet, a data packet (e.g., a data packet of any protocol), and a control packet.

Referring still to FIG. 3B, if an uplink packet that the electronic device 100 wants to transmit is a small packet and/or a delay-sensitive packet, then the electronic device 100 may assign (Block 326) a randomized delay period for the uplink packet. The randomized delay period may be defined by/derived from a randomized value that is generated and/or selected by the electronic device 100. For example, the randomized value may be selected from a range of values that are between a minimum and a maximum value. On the other hand, if an uplink packet that the electronic device 100 wants to transmit is not a small packet and/or a delay-sensitive packet, then the electronic device may use/select (Block 328) a static (e.g., fixed, constant rather than one possibility among many values in a given range) delay period for the uplink packet.

Referring now to FIG. 3C, operations of the electronic device 100 may optionally include receiving (Block 300) signaling, regarding uplink packet randomized time delays, from an access point (e.g., one of the WLAN access points 121, 122) of the WLAN to which the electronic device 100 is connected. In particular, the WLAN access point may analyze traffic behavior and responsively transmit a parameter (or other signaling) to the electronic device 100 for deriving a randomized time delay.

As an example, the signaling may include a command from the access point of the WLAN to enable or disable the uplink packet randomized time delays. In other words, the command may enable or disable the operations of Blocks 330 (FIG. 3A), 325 (FIGS. 3B and 3C), and 326 (FIGS. 3B and 3C). For example, randomized time delays may not be necessary if only one electronic device 100 is connected to the WLAN, or if traffic by one or more other electronic devices 100 on the WLAN is relatively light. On the other hand, the WLAN access point may decide to enable randomized time delays in response to sensing heavy/increased traffic, Moreover, the present inventive entity appreciates that the operations of Block 330' of FIGS. 3B and 3C are not limited to a randomized delay period. Specifically, the operations of Block 330' of FIGS. 3B and 3C may be for a randomized delay period or a static delay period.

As another example of signaling regarding uplink packet randomized time delays, the signaling received from a WLAN access point may include/provide one or more parameters regarding time delay values that define the uplink packet randomized time delays. In some embodiments, the parameters may include minimum and/or maximum values for the randomized time delays. In some embodiments, the parameters may include a command regarding whether the electronic device 100 should select/assign among a uniform or non-uniform distribution of the randomized time delays. In some embodiments, the WLAN access point may assign non-overlapping ranges of time delay values to different electronic devices 100. Alternatively, the WLAN access point may assign partially or fully overlapping ranges of time delay values to different electronic devices 100.

A non-uniform distribution, as used herein, refers to providing/generating a distribution of randomized time delay values such that the electronic device 100 may not be equally likely to select each individual value in a range of the values. In other words, some values may be more likely to be selected than others. A uniform distribution, on the other hand, refers to an equal likelihood of selecting any one of the values that are between a minimum value and a maximum value.

Additionally or alternatively, the parameters may be determined by the WLAN access point based on traffic behavior/patterns of the WLAN. For example, the signaling from the WLAN access point may define the randomization (e.g., define a range and/or distribution) of the delay periods based on a quantity of electronic devices 100 using the WLAN. As an example, the randomization when four electronic devices 100 use the WLAN may be different from the randomization when ten, forty, or more electronic devices 100 use the WLAN.

Accordingly, operations of Block 326 may include assigning/selecting a time delay value among a plurality of time delay values that define respective ones of the uplink packet randomized time delays, in response to receiving (Block 300) signaling, from the WLAN access point, that is based on traffic from the plurality of electronic devices 100 connected to the WLAN. As an example, the electronic device 100 may receive signaling from the WLAN access point to increase a range (e.g., minimum and/or maximum values) of randomized time delays in response to heavy/increased traffic.

In yet another example regarding uplink packet randomized time delays, the signaling received from a WLAN access point may define the transmission conditions under which an electronic device 100 will use a randomized time delay. For example, the WLAN access point may define a threshold size for a packet, under which threshold size the electronic device 100 should use a randomized time delay. In other words, in some embodiments, an electronic device 100 may provide a randomized time delay only for packets having a size smaller than the threshold size, and the WLAN access point may provide signaling to the electronic device 100 to define the threshold, thus defining a size of what the electronic device 100 will consider (e.g., in Block 325) a small packet. For example, a small packet may be defined as being smaller than 250 bytes, smaller than 300 bytes, smaller than 350 bytes, etc. Moreover, in some embodiments, a small packet may be defined as being in a size range (e.g., a range between 100 bytes and 250 bytes).

Figure 4A:
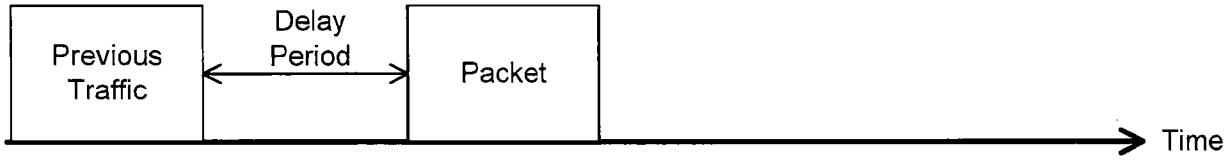
FIGS. 4A-4C illustrate diagrams of time delay periods used by an electronic device, according to some embodiments.
Figure 4B:
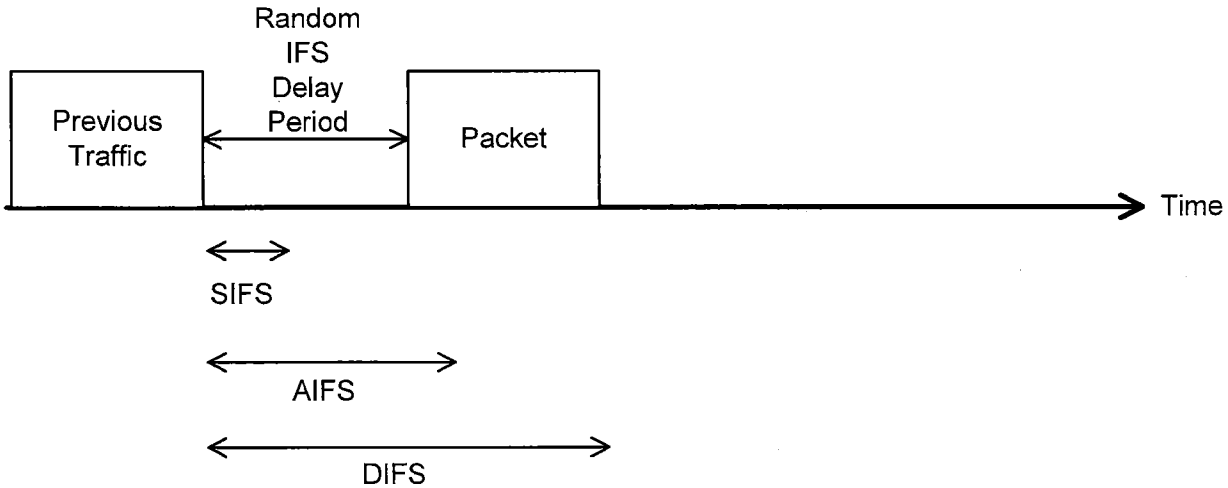
Figure 4C:
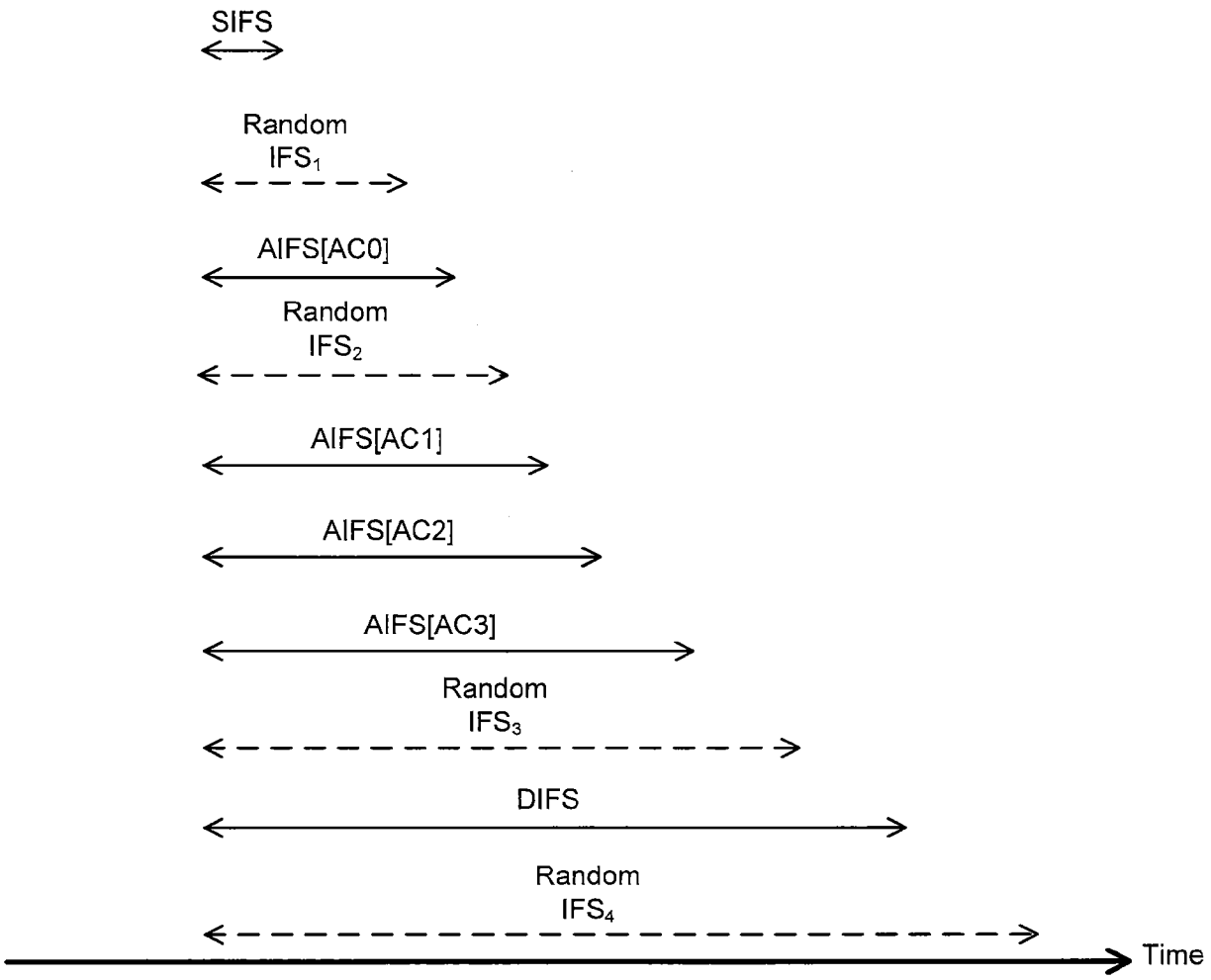

FIGS. 4A-4C illustrate diagrams of time delay periods used by an electronic device 100 according to some embodiments. Referring now to FIG. 4A, a delay time period (e.g., time interval) is illustrated between previous traffic (e.g., any type of traffic) that has been transmitted via a WLAN and transmission of a packet by an electronic device 100 via the WLAN, according to the operations FIGS. 3A-3C. In other words, the delay period illustrated in FIG. 4A may be a randomized or static delay period that is selected/assigned and implemented by the electronic device 100 before the electronic device 100 can transmit the packet.

Referring now to FIG. 4B, a randomized delay period described herein may, in some embodiments, be a random/randomized Inter-Frame Spacing/Spaces (IFS) delay period. In other words, operations of transmitting (Block 340) a packet may include transmitting the packet to a WLAN access point via a wireless communications channel after a randomized IFS delay period. A randomized value that defines a particular randomized IFS delay period for a packet may be generated/created in the electronic device 100 that is waiting to transmit the packet. For example, the processor 251 of the electronic device 100 may use an algorithm to generate/create the value (among other values within a given range). Moreover, the algorithm may assign/select a new randomized IFS value before transmitting each small packet. Although the same IFS value may optionally be used in some embodiments for multiple packets (e.g., for consecutive packets or on a periodic/rotating basis), various embodiments herein involve individually selecting/assigning a randomized IFS value for each small packet and may provide a distribution of IFS values that increases the likelihood of assigning/selecting a unique randomized IFS value for each small packet, across a relatively large number of packets transmitted by the electronic device 100.

A randomized IFS value may be used by an electronic device 100 that uses a Carrier Sense Multiple Access (CSMA) protocol to verify the absence of other traffic before transmitting in a WLAN. Such an electronic device 100 may use predefined (e.g., static, non-randomized) IFS delay/waiting periods for some types of packets after traffic clears. The predefined IFS delay/waiting periods may include Short IFS (SIFS), Arbitration inter-frame spacing (AIFS), and Distributed IFS (DIFS).

SIFS is a small time interval that may be used for high priority transmissions, thus providing a higher probability of obtaining access to a channel. In other words, a higher priority, as used herein, corresponds to a shorter timing delay period and a higher probability of obtaining access to a channel. In WLANs, SIFS may be defined to be the smallest IFS. Moreover, a SIFS duration is a static (e.g., constant, fixed) value. Accordingly, in some embodiments herein, a randomized IFS delay period may be at least as long as a SIFS delay period. Examples of information that will be transmitted after the SIFS time interval has been completed may include Acknowledgment (ACK) and Clear To Send (CTS) messages. For example, an acknowledgment packet transmitted by an electronic device 100 in response to receiving downlink traffic (e.g., downlink video traffic) from a WLAN access point may be referred to as an ACK message.

AIFS time intervals may be used to prioritize between different Access Categories (ACs). For example, AIFS time intervals may be used to prioritize voice or video packets over email packets. Moreover, DIFS time intervals may be longer than AIFS time intervals. DIFS time intervals are longer and thus may be used for data (or other signaling/information) without a high priority. For example, standard Internet traffic, etc. may use DIFS time intervals. Respective AIFS and DIFS durations are static (e.g., constant, fixed) values.

Referring now to FIG. 4C, a randomized IFS delay period may range from a time longer than a SIFS delay period to a time interval longer than a DIFS delay period. For example, FIG. 4C illustrates that the random (e.g., randomized) $IFS_1$ is longer than the SIFS but shorter than the AIFS that corresponds to the AC0 (which AIFS is also referred to as the AIFS[AC0]). In another example, the random $IFS_2$ is longer than the AIFS[AC0] but shorter than the AIFS[AC1]. In yet another example, the random $IFS_3$ is longer than the AIFS[AC3] but shorter than the DIFS. Moreover, the random $IFS_4$ is longer than the DIFS. Accordingly, a random/randomized IFS delay period described herein may be any length of time that is at least as long as the SIFS (or is otherwise at least as long as the shortest allowed delay period). Efficiency may be improved when a random/randomized IFS is not the same as the DIFS, an AC of the AIFS, or the SIFS.

An electronic device 100 that is waiting to transmit a packet may select/determine the relationship between (i) a randomized IFS value (and/or a range of randomized IFS values from which that randomized IFS value is selected) corresponding to the packet and (ii) other IFS variants (e.g., SIFS, AIFS, and/or DIFS). For example, by selecting the randomized IFS values to be lower than the DIFS, small packets using the randomized IFS values may be prioritized over other traffic that uses DIFS. As another example, an average value and/or a range of randomized IFS values may be selected to have the same or higher priority in comparison with one of the AIFS ACs. In one example, the randomized IFS values could be centered around the DIFS and could have a distribution of +/−4.0 microseconds with respect to the DIFS. Even if the randomized IFS values have the same average priority as one of the AIFS ACs (or the DIFS), the randomized IFS values may provide increased efficiency due to fewer collisions (and thus fewer penalty/backoff schemes).

An electronic device 100, and/or a WLAN access point in communication with the electronic device 100, may determine/select a distribution (e.g., in terms of uniformity, non-uniformity, minimum/maximum values, etc.) of randomized IFS values, to improve performance for particular traffic circumstances and/or particular WLAN networks. For example, the electronic device 100 and/or the WLAN access point may make the determination(s)/selection(s) in response to a measurement of traffic on the WLAN. In other words, the distribution of randomized IFS values for the electronic device 100 may depend on the traffic. Moreover, the electronic device 100 (either independently or using a command/signal received from the WLAN access point) may determine/select a particular one among a plurality of different distributions of randomized (e.g., random or pseudo-random) values. For example, the different distributions may achieve different respective packet transmission behaviors/results (e.g., in terms of delay time/efficiency).

Various embodiments herein describe a scenario in which multiple electronic devices 100 in a network are waiting for another electronic device 100 to finish its transmission before they can begin their own transmissions. For example, four electronic devices 100 in a network provided by the WLAN access point 121 of FIG. 1 may be waiting for the electronic device 100-A to finish its transmission of a packet to the WLAN access point 121. Once the electronic device 100-A is silent after its transmission, all four of the other electronic devices 100 will start delaying/counting (e.g., start delaying/counting an IFS time) and will be allowed to start transmitting after their delays (e.g., their IFS delays). If multiple ones of the four other electronic devices 100 start transmitting at the same time, however, then the transmitted packets may collide.

Accordingly, various embodiments of present inventive concepts provide randomized delay periods (e.g., randomized IFS delay periods) that help to reduce such collisions by reducing the likelihood that multiple ones of the four other electronic devices 100 will start transmitting at the same time. In other words, if each of the electronic devices 100 uses a randomized delay period for each of its delay-sensitive packets, then there is an increased likelihood that the electronic devices 100 will use respective randomized delay periods having different values (e.g., delay periods that are separated by a microsecond or another length of time).

Accordingly, using randomized delay periods according to various embodiments of present inventive concepts may provide a higher throughput for small packets of an electronic device 100. Moreover, the higher throughput may reduce the power consumption of the electronic device 100, which may improve the battery life of the electronic device 100.

In the above-description of various embodiments of present inventive concepts, it is to be understood that the terminology used herein is for the purpose of describing particular embodiments only and is not intended to be limiting of inventive concepts. Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

It will be understood that, although the terms "first," "second," etc. may be used herein to describe various elements, these elements should not be limited by these terms. These terms are only used to distinguish one element from another. Thus, a "first" element could be termed a "second" element without departing from the teachings of the present embodiments.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, elements, steps, components or functions but does not preclude the presence or addition of one or more other features, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above-disclosed subject matter is to be considered illustrative, and not restrictive, and the following claims are intended to cover all such modifications, enhancements, and other embodiments, which fall within the spirit and scope of present inventive concepts.

What is claimed is:

1. A method of operating a first electronic device, the method comprising:

listening for a wireless transmission by a second electronic device on a wireless communications channel;

determining whether a packet comprises a particular type of packet;

assigning a randomized time delay value that defines a randomized delay period, [in response to] *based on* determining that the packet [is the particular type of packet] *comprises a control packet*;

beginning the randomized delay period [in response to] *based on* determining that the wireless communications channel is clear; and transmitting the packet via the wireless communications channel based on expiration of the randomized delay period.

2. The method of claim 1, [wherein the packet comprises a control packet] *further comprising: assigning a different randomized time delay value, based on determining that the packet comprises an acknowledgement packet or a data packet.*

3. The method of claim 1, wherein the packet comprises a first uplink packet of the first electronic device, wherein the randomized delay period comprises a first randomized delay period, wherein the wireless transmission by the second electronic device comprises a first wireless transmission by the second electronic device on the wireless communications channel, and wherein the method further comprises: listening for a second wireless transmission by the second electronic device or by a third electronic device on the wireless communications channel; beginning a second randomized delay period [in response to] *based on* listening for the second wireless transmission and determining that the wireless communications channel is clear; and transmitting a second uplink packet via the wireless communications channel based on expiration of the second randomized delay period.

4. The method of claim 3, wherein the first and second randomized delay periods comprise different first and second quantities of time, respectively, and wherein transmitting the second uplink packet comprises transmitting the second uplink packet via the wireless communications channel based on the expiration of the second randomized delay period that comprises the second quantity of time that is different from the first quantity of time of the first randomized delay period.

5. The method of claim 1, wherein the packet comprises a first uplink packet of the first electronic device, wherein the wireless transmission by the second electronic device comprises a first wireless transmission by the second electronic device on the wireless communications channel, and wherein the method further comprises: listening for a second wireless transmission by the second electronic device or by a third electronic device on the wireless communications channel; beginning a static delay period [in response to] *based on* listening for the second wireless transmission and determining that the wireless communications channel is clear; and transmitting a second uplink packet via the wireless communications channel after the static delay period.

6. The method of claim 1, wherein transmitting the packet comprises transmitting the packet to an access point of a wireless network via the wireless communications channel based on the expiration of the randomized delay period, and wherein the method further comprises receiving signaling from the access point of the wireless network regarding uplink packet randomized time delays.

7. The method of claim 6, wherein receiving the signaling comprises receiving a command from the access point of the wireless network to enable or disable the uplink packet randomized time delays.

8. The method of claim 6, wherein receiving the signaling comprises receiving signaling from the access point of the wireless network providing one or more parameters regarding time delay values defining the uplink packet randomized time delays.

9. The method of claim 6, wherein the first electronic device comprises one of a plurality of electronic devices connected to the wireless network, wherein receiving the signaling comprises receiving signaling, from the access point of the wireless network, that is based on traffic from the plurality of electronic devices connected to the wireless network, and wherein the method further comprises selecting a time delay value among a plurality of time delay values that define respective ones of the uplink packet randomized time delays, [in response to] *based on* receiving the signaling from the access point of the wireless network that is based on the traffic from the plurality of electronic devices connected to the wireless network.

10. The method of claim 1, wherein the randomized delay period comprises a randomized Inter-Frame Spacing (IFS) delay period that is longer than a Short IFS (SIFS) delay period, and wherein transmitting the packet comprises transmitting the packet via the wireless communications channel after the randomized IFS delay period.

11. The method of claim 1, wherein determining whether the packet comprises the particular type of packet comprises determining whether the packet is a delay-sensitive uplink packet, and wherein assigning the randomized time delay value comprises assigning the randomized time delay value that defines the randomized delay period, [in response to] *based on* determining that the packet is a delay-sensitive uplink packet.

12. The method of claim 1, further comprising selecting a particular distribution among a plurality of different distributions of randomized values, wherein the randomized delay period is defined by one of the randomized values of the particular distribution.

13. The method of claim 1, wherein transmitting the packet comprises transmitting the packet to an access point of a Wireless Local Area Network (WLAN) via the wireless communications channel based on the expiration of the randomized delay period.

14. The method of claim 1, wherein the packet comprises an unaggregated streaming video uplink data packet, and wherein transmitting the packet comprises transmitting the unaggregated streaming video uplink data packet via the wireless communications channel based on the expiration of the randomized delay period.

15. A first electronic device, comprising:

a network interface connected to an antenna and configured to provide a wireless communications interface; and a processor circuit configured to:

control listening, via the network interface, for a wireless transmission by a second electronic device on a wireless communications channel;

determine whether a packet comprises a particular type of packet;

assign a randomized time delay value that defines a randomized delay period, [in response to] *based on* determining that the packet [is the particular type of packet] *comprises a control packet*;

begin a randomized delay period [in response to] *based on* determining that the wireless communications channel is clear; and control transmission, via the network interface, of the packet via the wireless communications channel based on expiration of the randomized delay period.

16. The electronic device of claim 15, wherein the *processor circuit is further configured to: assign a different randomized time delay value, based on determining that the* packet comprises an acknowledgement packet[,] *or* a data packet[, or a control packet].

17. The *first* electronic device of claim 15, wherein the packet comprises an unaggregated streaming video uplink data packet, and wherein the processor circuit is configured to transmit the packet by transmitting, via the network interface, the unaggregated streaming video uplink data packet via the wireless communications channel based on the expiration of the randomized delay period.

18. A computer program product, comprising: a tangible, non-transitory computer readable storage medium comprising computer readable program code therein that when executed by a processor of a first electronic device causes the processor to perform operations comprising:

controlling listening, via a network interface configured to provide a wireless communications interface, for a wireless transmission by a second electronic device on a wireless communications channel;

determining whether a packet comprises a particular type of packet;

assigning a randomized time delay value that defines a randomized delay period, [in response to] *based on* determining that the packet [is the particular type of packet] *comprises a control packet*;

beginning a randomized delay period [in response to] *based on* determining that the wireless communications channel is clear; and controlling transmission, via the network interface, of the packet via the wireless communications channel based on expiration of the randomized delay period.

*19. The method of claim 1, further comprising: assigning a different randomized time delay value that defines the randomized dealy period based on determining that the packet comprises an acknowledgement packet or a data packet.*

* * * * *